United States Patent [19]

Waskiewicz

[11] Patent Number: 5,511,887
[45] Date of Patent: Apr. 30, 1996

[54] ADAPTOR FOR INNER BEARING RING BORE

[75] Inventor: Walter P. Waskiewicz, Bristol, Conn.

[73] Assignee: The Torrington Company, Torrington, Conn.

[21] Appl. No.: 497,006

[22] Filed: Jun. 30, 1995

[51] Int. Cl.[6] .................................................. F26C 27/06
[52] U.S. Cl. ............................................. 384/536; 384/537
[58] Field of Search .................................. 384/460, 535, 384/536, 537, 539, 42

[56] References Cited

U.S. PATENT DOCUMENTS

| | | | |
|---|---|---|---|
| 2,608,451 | 8/1952 | Pierce, Jr. ............................. | 384/536 |
| 2,835,540 | 5/1958 | Jorgensen ............................. | 384/42 |
| 3,897,988 | 8/1975 | Dickinson et al. ................... | 384/537 X |
| 4,142,618 | 3/1979 | Fontaine et al. ..................... | 384/535 X |
| 4,339,159 | 7/1982 | Miller .................................. | 384/539 |
| 5,125,755 | 6/1992 | Adler et al. ......................... | 384/537 X |

*Primary Examiner*—Thomas R. Hannon
*Attorney, Agent, or Firm*—John C. Bigler

[57] ABSTRACT

A tubular portion of the adaptor has a non-cylindrical outer surface to be received within an inner bearing ring bore and a non-cylindrical inner surface to receive a non-cylindrical shaft. Flanges are directed substantially radially outwardly from the tubular portion at the adaptor ends to engage the end surfaces of the inner bearing ring. Slots distributed along the perimeter of at least one adaptor end and extending longitudinally through the flange and part of the tubular portion form a plurality of retention fingers. The retention fingers may bend radially inwardly and outwardly to permit insertion into the inner bearing ring and to accommodate dimensional variation of the non-cylindrical bore and the non-cylindrical shaft.

22 Claims, 1 Drawing Sheet

ADAPTOR FOR INNER BEARING RING BORE

BACKGROUND OF THE INVENTION

This invention relates generally to rolling element bearings and, more particularly, to an adaptor for mounting an inner bearing ring with a non-cylindrical bore on a non-cylindrical shaft.

In agricultural implements, conveyors and similar applications, rolling element bearings with a hex bore (or other non-cylindrical bore) may be utilized to simplify mounting of the bearings. Typically, a hex bore of an inner bearing ring of the bearings forms a slip fit over hex shafting such that the end-wise positioning of the bearings is provided by adjacent parts. In that manner, no collars, set screws or other locking device is required to lock the inner bearing ring to the shaft.

The inner bearing ring may be made of heat treated high carbon steel, and the hex bore must be formed accurately of that material and with a close tolerance to allow sliding on the hex shaft without excessive noise or pounding. Generally, broaching or other expensive machining of the inner bearing ring is required. Other problems may develop during use of the bearings if sliding of the inner bearing ring on the shaft is inhibited by corrosion, fretting or other causes.

The foregoing illustrates limitations known to exist in present rolling element bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adaptor comprising a tubular portion with a non-cylindrical outer surface to be received within an inner bearing ring bore and a non-cylindrical inner surface to receive a non-cylindrical shaft. Flanges are directed substantially radially outwardly from the tubular portion at the adaptor ends to engage the end surfaces of the inner bearing ring. Slots distributed along the perimeter of at least one adaptor end and extending longitudinally through the flange and part of the tubular portion form a plurality of retention fingers. The adaptor is formed integrally of a resilient material such that the retention fingers may bend radially inwardly and outwardly to permit insertion into the inner bearing ring and to accommodate dimensional variation of the non-cylindrical bore and the non-cylindrical shaft.

In another aspect of the present invention, this is accomplished by providing a rolling element bearing assembly including an adaptor received within a non-cylindrical inner bearing ring bore and providing a non-cylindrical inner surface.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
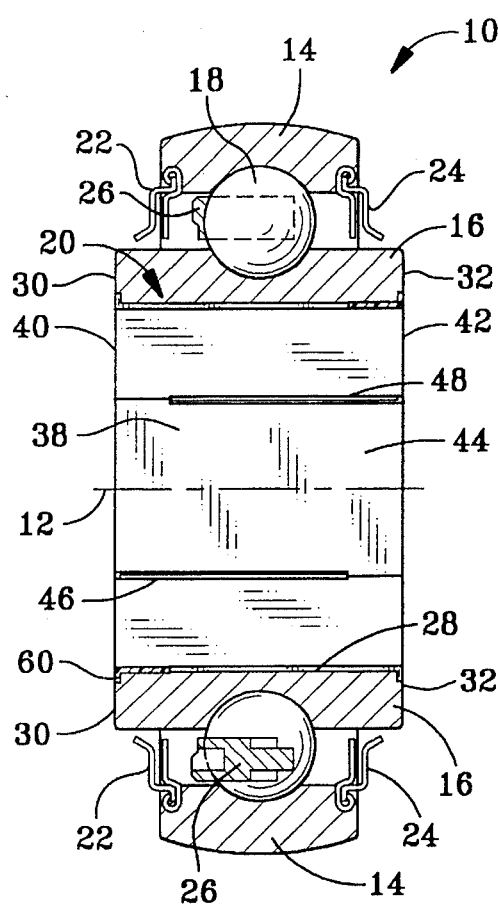
FIG. 1 is a cross-sectional view of a rolling element bearing fitted with an adaptor illustrating an embodiment of the adaptor for inner bearing ring bore of the present invention.

Referring now to the drawings, FIG. 1 illustrates rolling element bearing assembly 10 having axis 12, outer bearing ring 14, inner bearing ring 16, rolling elements 18, and adaptor 20 of the present invention. Optional bearing seals 22 and 24 and bearing retainer 26 are also illustrated, although they are not required for the practice of this invention. Inner bearing ring 16 has hexagonal bore 28 and first and second end surfaces 30 and 32, respectively.

Figure 2:
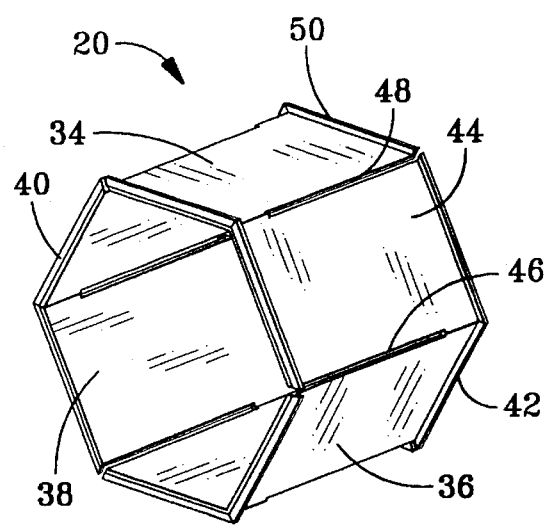
FIG. 2 is a pictorial view of the adaptor for inner bearing ring bore of FIG. 1.
Figure 3:
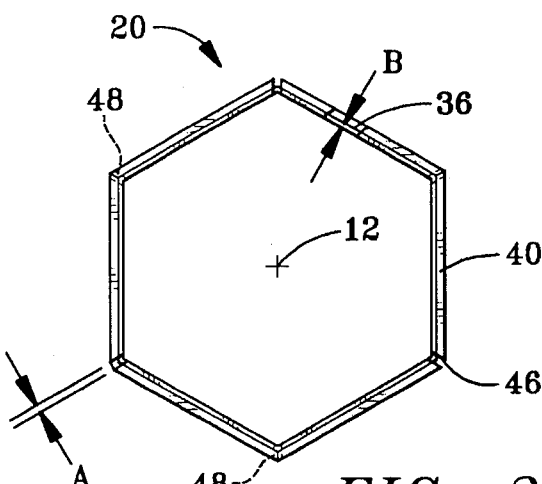
FIG. 3 is an end view of the adaptor for inner bearing ring bore of FIG. 1, with a portion of the adaptor cut away.

As shown more clearly in FIG. 2, adaptor 20 includes tubular portion 34 having hexagonal outer surface 36, sized to fit within inner bearing ring hexagonal bore 28, and hexagonal inner surface 38, configured to form a sliding fit with a hexagonal shaft, not shown, and provides first and second adaptor ends 40 and 42, respectively. Although outer surface 36 and inner surface 38 of the embodiment of FIG. 1 are hexagonal in cross-section to receive a hexagonal bore and shaft, other anticipated embodiments have square, octagonal, splined, multi-sided or otherwise non-cylindrical configuration to receive various non-cylindrical shafts.

Adaptor 20 is segmented into retention fingers 44 by slots 46 and 48 that extend longitudinally from one end of adaptor 20 to a distance less than the length of adaptor 20. The slots may all be from the same end of adaptor 20 and may be located variously about the perimeter of tubular portion 34. Preferably, however, slots 46 and 48 originate at opposite adaptor ends 40 and 42, respectively, and are regularly spaced at corners of tubular portion 34, as shown by the embodiment illustrated.

Slots 46 and 48 may be of varying width, thickness and length, depending on the size of bearing assembly 12, the size of the shaft, and the amount of dimensional tolerance to be accommodated. For example, slots having width A of 0.020 inch, thickness B of 0.020 inch, and length C of approximately 80 percent of the distance between adaptor ends 40 and 42 have been found to be suitable for one particular application having hex shafting measuring 1.5 inch across the flats and having moderate dimensional tolerances.

Figure 4:
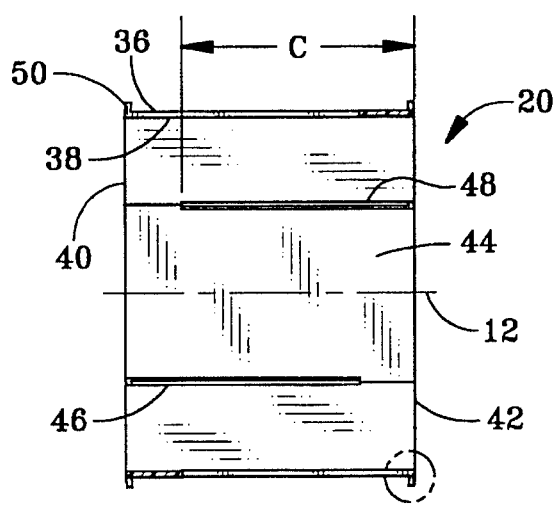
FIG. 4 is a cross-sectional view showing the adaptor for inner bearing ring bore of FIG. 1 prior to installation in the rolling element bearing.
Figure 5:
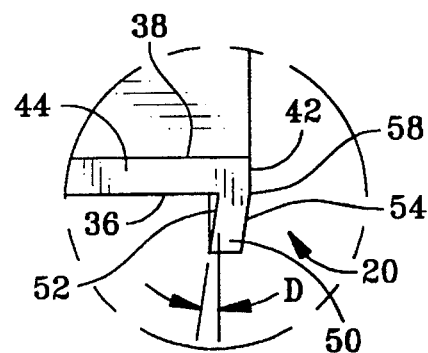
FIG. 5 is an enlarged detail view of a portion of the adaptor for inner bearing ring bore of FIG. 1, as indicated by the phantom line of FIG. 4.

As best shown in FIGS. 4 and 5, retention fingers 44 include flanges 50 along the perimeter of adaptor ends 40 and 42. Flanges 50 are directed substantially radially outwardly from hexagonal outer surface 36 of tubular portion 34 but are angled axially inwardly, slightly, to facilitate axial insertion of adaptor 20 by pressing. For example, angle D may be approximately 5 degrees, making flanges 50 form an 85 degree angle with hexagonal outer surface 36 (and with axis 12). Other angles may be used with similar effect.

Both axially opposite faces 52 and 54 of flanges 50 are directed at angle D from the radial direction, providing a thickness in the axial direction that is uniform from hexagonal outer surface 36 out to flange tip 56, as shown in FIG. 5. Although other shapes may be used with similar effect, flange tip 56 may be perpendicular to the axially opposite faces of flanges 50, as illustrated. Juncture 58, at the intersection of adaptor end 40 (or 42) and an end face of flange 50 may be an annular ridge or a blended surface.

Adaptor 20 may be conveniently molded of a resilient material such that foldable flanges 50 transiently fold axially inwardly when adaptor 20 is press-fit into bearing ring hexagonal bore 28. After insertion, flanges 50 unfold to their initial configuration (or to a radially directed position) and engage inner bearing ring end surfaces 30 and 32 to retain adaptor 20 in inner bearing ring 16. Inner bearing ring end surfaces 30 and 32 may include annular groove 60 to recess flanges 50 such that adaptor ends 40 and 42 are flush.

Several materials are suitable for forming adaptor 20 by molding or other means. Various polymers and elastomers are considered preferred materials, such as, for example, a "toughened" polyamide known as Zytel ST801 available from DuPont Engineering Polymers of Wilmington, Del. When made of such materials, adaptor 20 reduces noise and eliminates corrosion and fretting that might inhibit sliding of the bearing assembly along the non-cylindrical shaft.

Slots 46 and 48 allow adaptor 20 to resiliently expand and contract in the radial direction to accommodate dimensional variations of the hexagonal shaft and inner bearing ring hexagonal bore 28. In addition, the adaptor of the present invention may be molded economically in a "family" of sizes to permit a standardized inner bearing ring to be used with oversize and undersize shafts. As a result, the shaft and inner bearing ring bore do not require close dimensional tolerances, and expensive machining operations such as broaching the bore and milling the shaft are therefore avoided.

From the above description, it will be apparent that the present invention permits a rolling element bearing assembly to be fabricated economically with a non-cylindrical bore for engagement with a non-cylindrical shaft. The adaptor reduces pounding, fretting, noise, and corrosion and facilitates sliding movement of the rolling element bearing along the shaft. The adaptor is versatile and may be used with square, octagonal, splined, or other multi-sided or otherwise non-cylindrical shafts.

Having described the invention, what is claimed is:

1. An adaptor for use with an inner bearing ring, the inner bearing ring having an axis, a non-cylindrical bore and first and second end surfaces, the adaptor comprising;
    a tubular portion having a non-cylindrical outer surface to be received within the inner bearing ring non-cylindrical bore and a non-cylindrical inner surface to receive a non-cylindrical shaft, and providing first and second adaptor ends; and
    flanges directed substantially radially outwardly from the tubular portion at the first and second adaptor ends to engage the first and second end surfaces of the inner bearing ring;
    the adaptor having slots distributed along the perimeter of at least one of the first and second adaptor ends and extending longitudinally through at least one flange and part of the tubular portion such that a plurality of retention fingers are formed;
    the adaptor being formed integrally of a resilient material such that the retention fingers may bend radially inwardly and outwardly to permit insertion into the inner bearing ring and to accommodate dimensional variation of the non-cylindrical bore and the non-cylindrical shaft.

2. The adaptor for use with an inner bearing ring according to claim 1, wherein the non-cylindrical outer surface and the non-cylindrical inner surface are of similar configuration such that the tubular portion has a substantially uniform thickness.

3. The adaptor for use with an inner bearing ring according to claim 1, wherein the slots are regularly spaced about the perimeter of the adaptor and originate, alternately, at either the first adaptor end or the second adaptor end.

4. The adaptor for use with an inner bearing ring according to claim 1, wherein the flanges have a substantially uniform thickness in the axial direction.

5. The adaptor for use with an inner bearing ring according to claim 1, wherein the resilient material forming the tubular portion and foldable tabs is a polymer.

6. The adaptor for use with an inner bearing ring according to claim 1, wherein the resilient material forming the tubular portion and foldable tabs is an elastomer.

7. The adaptor for use with an inner bearing ring according to claim 1, wherein the non-cylindrical inner surface of the tubular portion is substantially hexagonal in cross-section to receive a hexagonal shaft.

8. The adaptor for use with an inner bearing ring according to claim 7, wherein the slots are located to correspond to the corners of the hexagonal shaft.

9. The adaptor for use with an inner bearing ring according to claim 1, wherein the non-cylindrical inner surface of the tubular portion is substantially square in cross-section to receive a square shaft.

10. The adaptor for use with an inner bearing ring according to claim 1, wherein the non-cylindrical inner surface of the tubular portion is splined to receive a splined shaft.

11. The adaptor for use with an inner bearing ring according to claim 1, wherein the flanges form an angle with respect to the bearing ring axis of between 80 and 88 degrees, sloping axially inwardly slightly.

12. The adaptor for use with an inner bearing ring according to claim 1, wherein the slots extend between 60 percent and 90 percent of the length of the tubular portion.

13. A rolling element bearing assembly having an axis and comprising:
    an inner bearing ring having a non-cylindrical bore and first and second end surfaces;
    an outer bearing ring;
    rolling elements between the inner and outer bearing rings; and
    an adaptor formed of a resilient material and having a tubular portion with a non-cylindrical outer surface received within the inner bearing ring bore and a non-cylindrical inner surface to receive a non-cylindrical shaft, and providing first and second adaptor ends;
    the adaptor having flanges directed substantially radially outwardly from the tubular portion at the first and second adaptor ends and engaging the first and second end surfaces of the inner bearing ring;
    at least one of the first and second adaptor ends having slots extending longitudinally such that retention fingers are formed to facilitate insertion of the adaptor and to accommodate dimensional variation of the non-cylindrical bore and the non-cylindrical shaft.

14. The rolling element bearing assembly according to claim 13, wherein the non-cylindrical outer surface and the non-cylindrical inner surface are of similar configuration such that the tubular portion has a substantially uniform thickness.

15. The rolling element bearing assembly according to claim 13, wherein the slots are regularly spaced about the perimeter of the adaptor and originate, alternately, at either the first adaptor end or the second adaptor end.

16. The rolling element bearing assembly according to claim 13, wherein the resilient material forming the tubular portion and foldable tabs is a polymer.

17. The rolling element bearing assembly according to claim 13, wherein the resilient material forming the tubular portion and foldable tabs is an elastomer.

18. The rolling element bearing assembly according to claim 13, wherein the non-cylindrical inner surface of the tubular portion is substantially hexagonal in cross-section to receive a hexagonal shaft.

19. The rolling element bearing assembly according to claim 18, wherein the slots are located to correspond to the corners of the hexagonal shaft.

20. The rolling element bearing assembly according to claim 13, wherein the non-cylindrical inner surface of the tubular portion is substantially square in cross-section to receive a square shaft.

21. The rolling element bearing assembly according to claim 13, wherein the flanges are initially formed with an angle sloping axially inwardly slightly such that the flanges are biased against the first and second end surfaces of the inner bearing ring.

22. The rolling element bearing assembly according to claim 13, wherein the slots extend between 60 percent and 90 percent of the length of the tubular portion.

* * * * *